United States Patent
Borden

(10) Patent No.: US 12,380,178 B1
(45) Date of Patent: Aug. 5, 2025

(54) DETECTION OF CANDIDATE WATER INTAKE LOCATIONS IN WASTEWATER SYSTEM

(71) Applicant: RH BORDEN SMART SOLUTIONS, LLC, Lehi, UT (US)

(72) Inventor: Jonathan R. Borden, Holladay, UT (US)

(73) Assignee: RH BORDEN SMART SOLUTIONS, LLC, Lehi, UT (US)

( * ) Notice: Subject to any disclaimer, the term of this patent is extended or adjusted under 35 U.S.C. 154(b) by 0 days.

(21) Appl. No.: 19/003,932

(22) Filed: Dec. 27, 2024

Related U.S. Application Data

(63) Continuation of application No. 18/967,348, filed on Dec. 3, 2024, now abandoned.

(51) Int. Cl.
    *G06F 18/213*      (2023.01)
(52) U.S. Cl.
    CPC .................. *G06F 18/213* (2023.01)
(58) Field of Classification Search
    CPC ..................................... G06F 18/213
    USPC .............................................. 703/9
    See application file for complete search history.

(56) References Cited

U.S. PATENT DOCUMENTS

| | | | | |
|---|---|---|---|---|
| 7,437,267 B2* | 10/2008 | Oka | ...... | G06Q 10/06 702/179 |
| 8,594,851 B1* | 11/2013 | Smaidris | ...... | G05D 9/12 137/88 |
| 8,983,667 B2* | 3/2015 | Smaidris | ...... | C02F 3/006 137/115.03 |
| 9,574,337 B1* | 2/2017 | Lang | ...... | B01D 21/0012 |
| 10,961,139 B1* | 3/2021 | Yaman | ...... | C02F 3/30 |
| 11,959,238 B1* | 4/2024 | Zhang | ...... | B09C 1/105 |
| 2002/0170350 A1* | 11/2002 | Schutzbach | ...... | E03F 1/00 73/195 |
| 2002/0173923 A1* | 11/2002 | Schutzbach | ...... | G01F 1/002 702/45 |
| 2003/0018432 A1* | 1/2003 | Helms | ...... | E03F 1/00 702/5 |
| 2005/0236327 A1* | 10/2005 | Gordon | ...... | B63B 35/44 210/242.1 |

(Continued)

OTHER PUBLICATIONS

Perez at al. ("The sanitary sewer unit hydrograph model: A comprehensive tool for wastewater flow modeling and inflow-infiltration simulations", Water Research, 2024, pp. 15) (Year: 2024).*

(Continued)

*Primary Examiner* — Iftekhar A Khan
(74) *Attorney, Agent, or Firm* — WORKMAN NYDEGGER

(57) ABSTRACT

The detection of candidate locations of water intake in a target basin of a wastewater system. This detection is done by performing computerized evaluation of hydrograph data sets that are each generated from sampling at a respective sample point of a target basin. Computerized pattern recognition is performed on the hydrograph data sets to identify one or more candidate locations of the target basin that are candidates for water intake. This identification is based on detection of characteristic patterns of water intake in the respective hydrograph data set. This allows for the automated detection of candidate locations of water intake in a target basin.

15 Claims, 12 Drawing Sheets

(56) References Cited

U.S. PATENT DOCUMENTS

| | | | | |
|---|---|---|---|---|
| 2009/0090473 | A1* | 4/2009 | Fielding | B01D 17/0217 |
| | | | | 114/382 |
| 2012/0072196 | A1* | 3/2012 | Adams | C02F 3/006 |
| | | | | 703/11 |
| 2014/0291239 | A1* | 10/2014 | Wang | C02F 3/107 |
| | | | | 210/615 |
| 2014/0324406 | A1* | 10/2014 | Nesbitt | E03F 3/02 |
| | | | | 703/9 |
| 2017/0074793 | A1* | 3/2017 | Strickler | G02B 26/12 |
| 2018/0017710 | A1* | 1/2018 | Beck | G01V 20/00 |
| 2020/0088609 | A1* | 3/2020 | Beck | G01N 1/2035 |
| 2020/0149262 | A1* | 5/2020 | Albers | C02F 3/327 |
| 2021/0317018 | A1* | 10/2021 | Wanger | A01K 63/045 |
| 2022/0004919 | A1* | 1/2022 | Zhang | G06F 18/2431 |
| 2022/0228356 | A1* | 7/2022 | Elag | G06N 5/00 |
| 2022/0274848 | A1* | 9/2022 | Imahashi | E03B 7/074 |
| 2022/0324737 | A1* | 10/2022 | Ozair | C02F 9/20 |
| 2023/0017568 | A1* | 1/2023 | Yu | B01D 53/502 |
| 2023/0106264 | A1* | 4/2023 | Fudge | C02F 1/008 |
| | | | | 210/615 |
| 2023/0153495 | A1* | 5/2023 | Louisell, III | G01V 20/00 |
| | | | | 703/11 |
| 2024/0363202 | A1* | 10/2024 | Louisell, III | G16C 20/70 |

OTHER PUBLICATIONS

Wang et al. ("Uncertainty analysis of a pollutant-hydrograph model in assessing inflow and infiltration of sanitary sewer systems", Journal of Hydrology, 2019, pp. 64-74). (Year: 2019).*

Karpf et al. (Quantification of groundwater infiltration and surface water inflows in urban sewer networks based on a multiple model approach, water research, 2011, pp. 3129-3136) (Year: 2011).*

Nguyen et al. (An Intelligent Pattern Recognition Model to Automate the Categorisation of Residential Water End-Use Events, Environmental Modelling & Software, 2012, pp. 1-83) (Year: 2012).*

* cited by examiner

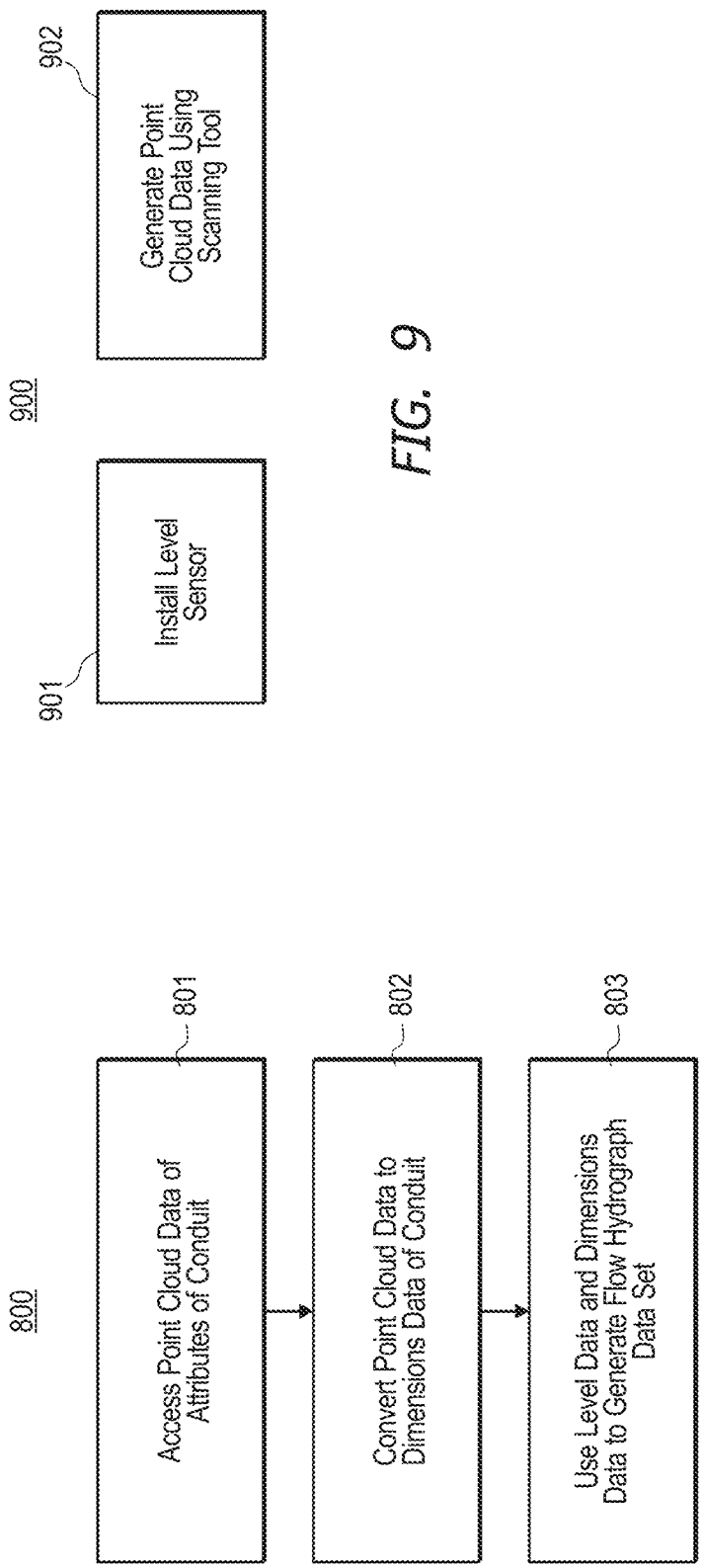

DETECTION OF CANDIDATE WATER INTAKE LOCATIONS IN WASTEWATER SYSTEM

CROSS-REFERENCE TO RELATED APPLICATIONS

This application is a continuation of prior application Ser. No. 18/967,348, filed Dec. 3, 2024, which is incorporated herein by reference in its entirety.

BACKGROUND

Wastewater collection begins at the source, which can include residential, commercial, and industrial areas. From these sources, wastewater is collected through a distributed underground network, which will be referred to as a "wastewater collection system" or a "wastewater system". The wastewater system channels the wastewater from the wastewater sources to a treatment system (such as a treatment plant), where the wastewater undergoes a series of processes to remove contaminants and ensure that the treated water is safe to be released back into the environment or reused for various purposes. The wastewater system and the treatment system are crucial for maintaining public health and environmental protection.

However, water can often flow or seep into the wastewater system at places other than the source of wastewater. As an example, water can seep into the wastewater system during wet weather events such as heavy rainfall or snowmelt. This process, known as infiltration, happens when excess water from these events seeps from saturated ground into the sewer system through cracks, joints, or other defects in the pipe. Another source of unwanted water in the distributed pipe network is inflow, which occurs when water pours into the wastewater system from external sources. As an example, during a flooding event or a heavy wet weather event, large volumes of water can quickly enter the wastewater system through manholes. As another example, a downspout from a house may have been improperly connected directly into the wastewater system.

This additional water entering the distributed network of pipes can significantly increase the volume of water that needs to be treated at the wastewater treatment plants, potentially overwhelming their capacity and reducing their efficiency. Furthermore, this additional water can overwhelm the wastewater system itself, as the wastewater system may not have capacity to handle the increased volume. As a result, the water may spill over into the environment, causing flooding and contamination of natural water bodies. Alternatively, the wastewater system may have to be oversized to accommodate heavy levels of inflow and infiltration.

The subject matter claimed herein is not limited to embodiments that solve any disadvantages or that operate only in environments such as those described above. Rather, this background is only provided to illustrate one exemplary technology area where some embodiments describe herein may be practiced.

BRIEF SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The principles described herein relate to the detection of candidate locations of water intake in a target basin of a wastewater system. This is done by performing computerized evaluation of hydrograph data sets that are each generated from sampling at a respective sample point of a target basin. Accordingly, the hydrograph data sets correspond to a plurality of sample points in the target basin. Each hydrograph data set represents a sampled value of the water (such as level, velocity, or flow) at the respective sample location. The sample points are relatively dense within the target basin. For instance, there may be at least ten sample points in the target basin and the sample points may be more than two per linear mile of the target basin.

Computerized pattern recognition is then performed on the plurality of hydrograph data sets to identify one or more candidate locations of the target basin that are candidates for water intake. This identification is based on detection of characteristic patterns of water intake in the respective hydrograph data set. This allows for the automated detection of candidate locations of water intake in a target basin. Such automation allows for water intake locations to be quickly identified and addressed. This reduces the risk of environmental harm due to the wastewater system being overloaded, allows wastewater systems to be smaller for a given amount of wastewater, and reduces the workload of the treatment system.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

To describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered limiting in scope, embodiments will be described and explained with additional specificity and details using the accompanying drawings in which:

FIG. 8 illustrates a flowchart of a method for converting time-wise level data into a flow hydrograph in the case of the dimensions data for the respective access point being acquired from point cloud data of attributes of the underlying conduit;

FIG. 9 illustrates a flowchart of a method for provisioning an access point for evaluation for water intake;

DETAILED DESCRIPTION

The principles described herein relate to the detection of candidate locations of water intake in a target basin of a wastewater system. This is done by performing computerized evaluation of hydrograph data sets that are each generated from sampling at a respective sample point of a target basin. Accordingly, the hydrograph data sets correspond to a plurality of sample points in the target basin. Each hydrograph data set represents a sampled value of the water (such as level, velocity, or flow) at the respective sample location. The sample points are relatively dense within the target basin. For instance, there may be at least ten sample points in the target basin and the sample points may be more than two per linear mile of the target basin.

Computerized pattern recognition is then performed on the plurality of hydrograph data sets to identify one or more candidate locations of the target basin that are candidates for water intake. This identification is based on detection of characteristic patterns of water intake in the respective hydrograph data set. This allows for the automated detection of candidate locations of water intake in a target basin. Such automation allows for water intake locations to be quickly identified and addressed. This reduces the risk of environmental harm due to the wastewater system being overloaded, allows wastewater systems to be smaller for a given amount of wastewater, and reduces the workload of the treatment system.

Figure 1:
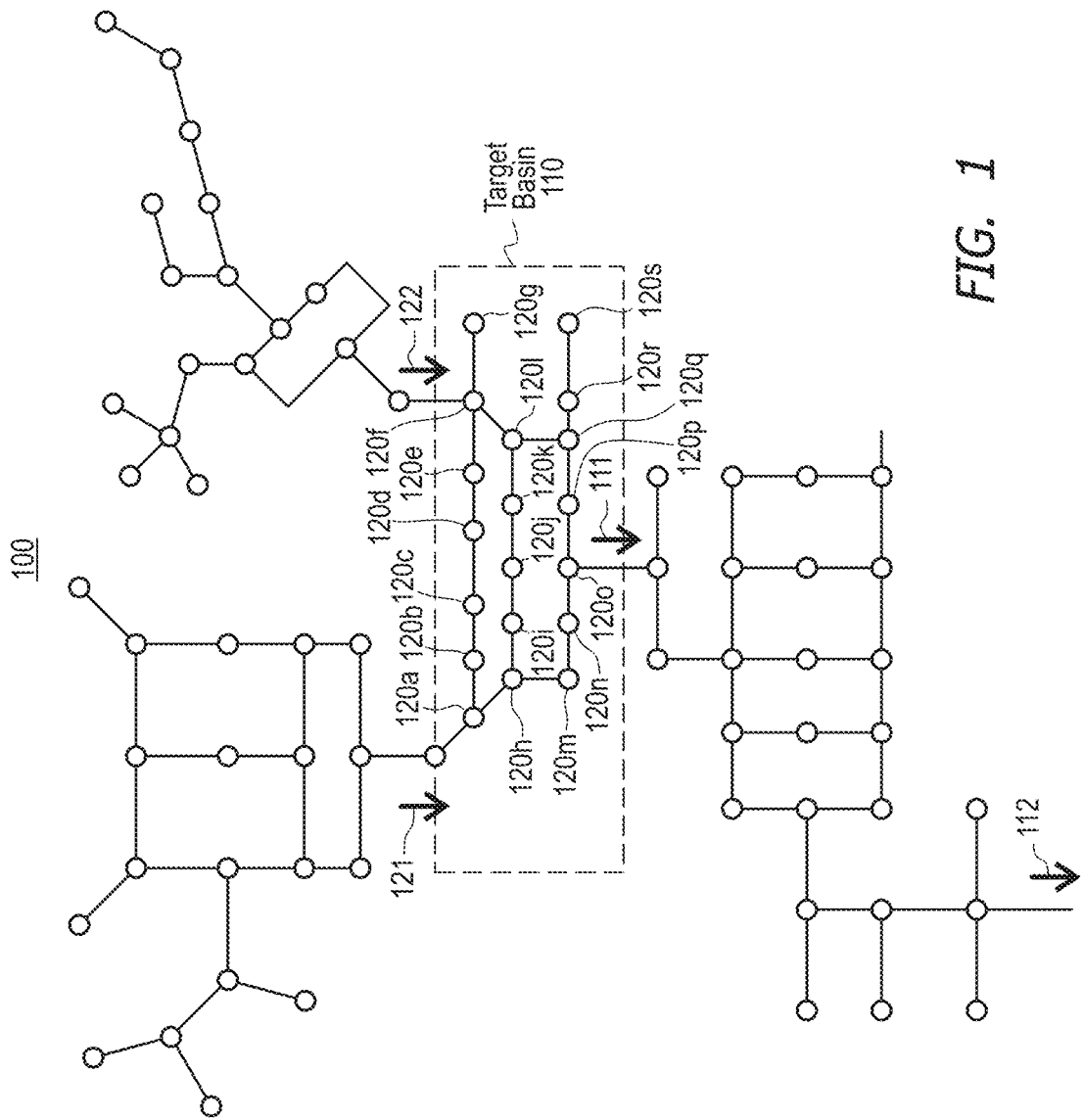
FIG. 1 illustrates a plan view of a geographic distribution of an example wastewater system.

First, an example wastewater system will be described with respect to FIG. 1. FIG. 1 illustrates a plan view of a geographic distribution of an example wastewater system 100. The example wastewater system 100 is a fictional example that will be referred to throughout the remainder of this description. Real wastewater systems will typically be much more intricate and detailed than the example wastewater system 100. Wastewater systems may be quite large, involving perhaps hundreds or even thousands of linear miles of underground conduit. The example wastewater system 100 is simplified to more clearly teach the principles described herein without undue complication. Of course, this example wastewater system 100 is just a mere example, and the principles described herein may be applied to any current or future wastewater system.

Referring to FIG. 1, the example wastewater system 100 has multiple access points each represented by a circle. For instance, each access point may be a manhole, where a human being can access the wastewater system 100. However, the principles described herein are not limited to the access points being manholes. Sensors may be installed at some, most, or all of the access points to allow the access point to be a sample point from which a respective hydrograph data set may be generated. As an example, in the case of a level sensor, a level hydrograph data set may be generated for the sample point. In the case of a velocity level sensor, a velocity hydrograph data set may be generated for the sample point. In the case of a flow level sensor, a flow hydrograph data set may be generated for the sample point.

Such sensors may be densely positioned within the target basin. For example, sensors may be placed at a density of at least two per linear mile of underground pipe in the target basin. However, the principles described herein may be applied even if the sample point density is at least five per linear mile, or even at least ten per linear mile. There may be even a sensor at each and every access point. It is preferred, however, that there be at least ten sensors (and perhaps even a hundred or more) such that the target basin is substantial enough that finding water intake can be challenging and thus benefit most by application of the principles described herein.

In some cases, the sensors may be pre-installed at some or all of the access points. Alternatively, some sensors may be temporarily placed in some or all of the access points. For instance, level sensors are currently quite compact and may be easily installed and removed. However, velocity and flow sensors may be similarly suitable for temporary installation particularly when considering improvements that may be made to such sensors in the future. Thus, the principles may also be applied to a target basin that is temporarily equipped with sensors.

The principles described herein relate to the automated detection of candidate locations of water intake in a target basin of a wastewater system. As an example only, the example wastewater system 100 of FIG. 1 is shown as including a target basin 110 represented within the dashed-lined box. The example target basin 110 is illustrated as having 19 access points labelled 120a through 120s (referred to collectively as "access points 120").

A target basin of a wastewater system is a portion of the wastewater system that has one or more common flow exits through which wastewater exits the target basin. As an example, the target basin 110 has a single common flow exit 111 through which wastewater exits the target basin 110. The flow exit may channel wastewater into further downstream portions of the wastewater system as is the case with the flow exit 111 of FIG. 1. However, in the case of the flow exit being the most downstream portion of the wastewater system, the flow exit of the target basin may also act as the flow exit of the wastewater system through which wastewater exits the entire wastewater system. That is not the case in the example of FIG. 1 as the wastewater that passes the flow exit 111 passes through further portions of the wastewater system before exiting the entire wastewater system through the flow exit 112.

The target basin may have zero or more flow entrances from which the target basin receives wastewater from upstream portions of the wastewater system. Of course, if the target basin has no flow entrances, the target basin is a most upstream portion of the wastewater system. However, when the target basin is not a most upstream portion of the wastewater system, there will be one or more flow entrances through which the target basin receives wastewater from upstream portions of the wastewater system. As a mere example, the target basin 110 shows two flow entrances 121 and 122 through which the target basin 110 receives wastewater from respective upstream portions of the wastewater system 100.

The target basin may receive water from either flow entrances or via flow intake. In this description, "flow entrance" refers to intended receipt of the target basin of wastewater from upstream portions of the wastewater system. This receipt of water is desirable and would occur in an ideally operating wastewater system, since the very function of a wastewater system is indeed to channel wastewater through the wastewater system. On the other hand, "water intake" refers to the undesired receipt of water into the target basin due to defects in the target basin. For instance, water may infiltrate from the surrounding ground into the underground pipe due to cracks, holes, seams, or the like in the underground pipes of the target basin, which is referred to as water infiltration. As another example, water inflow may occur by water rapidly flowing into the target basin from the surrounding surface environment through access points (e.g., manhole covers) that are left open or improper connections into the wastewater system-such as residential downspouts connected directly into the wastewater system.

It is this water intake that threatens the proper functioning of the wastewater system or downstream wastewater treatment. This is because this water intake adds to the volume of wastewater than must be handled by the wastewater system, in addition to the wastewater system's normal function of channeling wastewater from wastewater sources. Accordingly, this water intake has the potential for oversaturating the wastewater system, potentially even resulting in backflow of wastewater up through the access points into the environment—a clear environmental and public health hazard.

Accordingly, the principles described herein aim to more quickly and easily identify problems with water intake in a target basin so that those problems may be quickly remediated. Such rapid detection (resulting in rapid and targeted remediation) has the effect of reducing the risk of environmental damage or public health risk since the wastewater system operates more optimally with reduced amounts of water intake.

Figure 2:
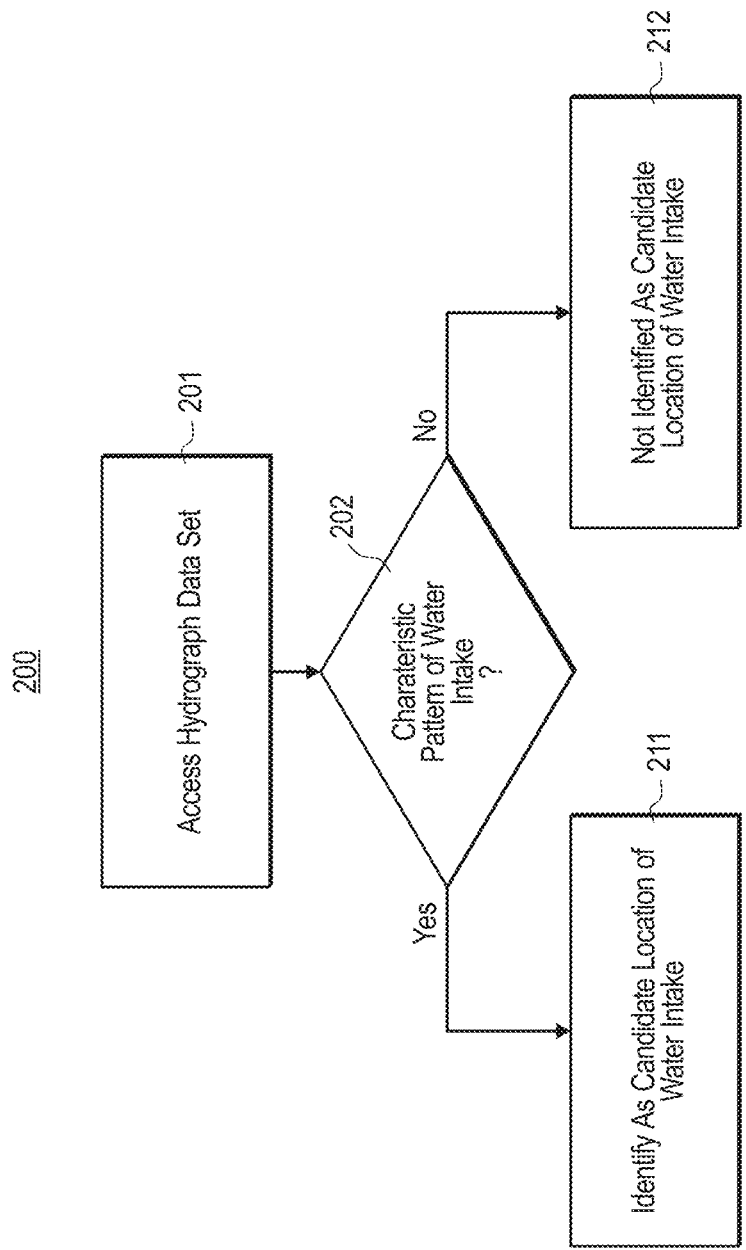
FIG. 2 illustrates a flowchart of a method for a computing system to evaluate a location of the target basin for candidacy for water intake.

FIG. 2 illustrates a flowchart of a method 200 for a computing system to evaluate a location of the target basin for candidacy for water intake. The method 200 may be performed for multiple locations in the target basin such that the computing system identifies one or more candidate locations for water intake in the target basin, in accordance with the principles described herein.

The method includes accessing a hydrograph data set (act 201). The hydrograph data set is a set of water parameter data sampled over time from one of the access points. As an example, the water parameter could be a water level, a water velocity and/or a water flow of the water passing through the conduit underlying the access point. The hydrograph data set is modified by the term "hydrograph" because the data includes sufficient data to form a visualization of the parameter over time—which visualization is referred to as a "hydrograph". However, the computing system may perform the analysis on the hydrograph data set itself, and does not require the associated visualization of that hydrograph data set. That is, the computing system does not require the rendering or display of a hydrograph.

The method 200 then includes performing computerized pattern recognition of the hydrograph data set to determine, based on detection of characteristic patterns of water intake present in the respective hydrograph data sets, whether the respective sample location of the target basin is a candidate for water intake (act 202). Specifically, if there is a characteristic pattern of water intake present in the hydrograph data set ("Yes" in decision block 202), the corresponding sample point is identified as a candidate location for water intake (act 211). Otherwise, if there is not a characteristic pattern of water intake present in the hydrograph data set ("No" in decision block 202), the corresponding sample point is not identified as a candidate location for water intake (act 212).

Figure 3:
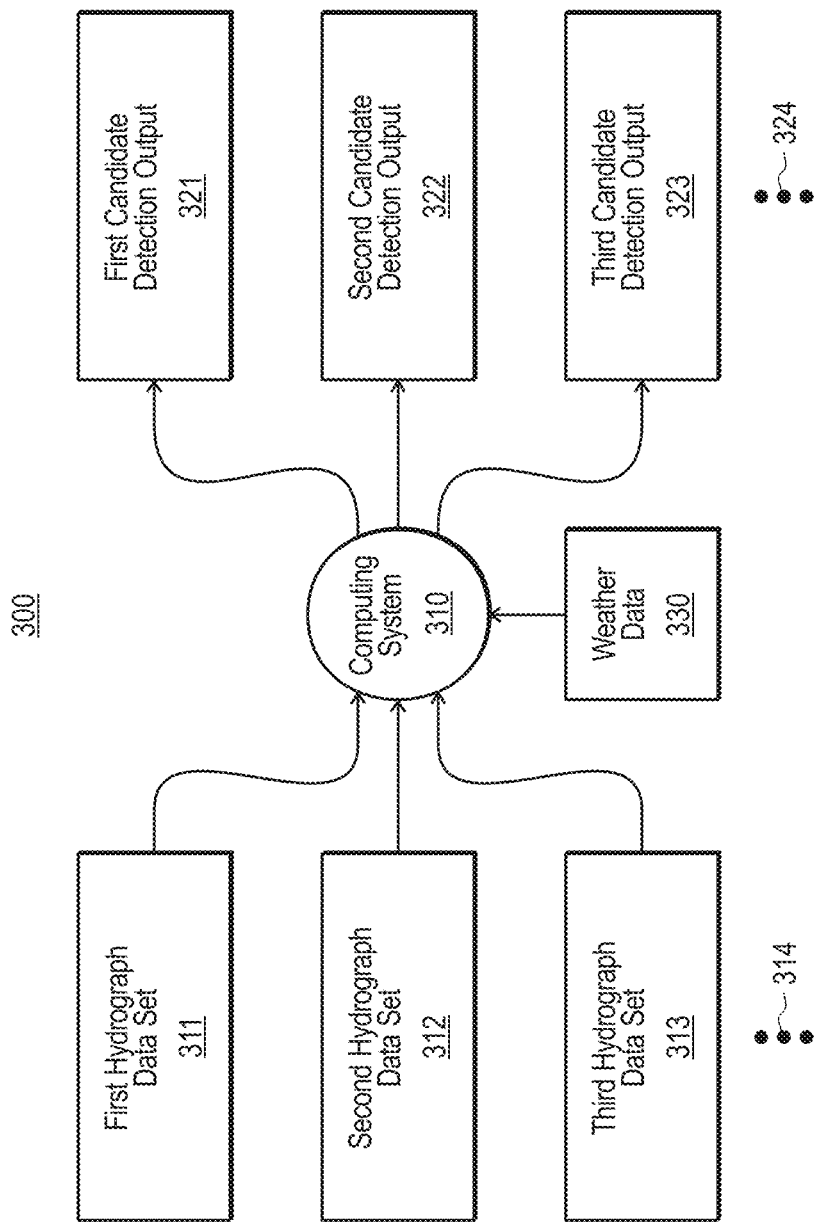
FIG. 3 illustrates an environment in which the method of FIG. 2 may be performed multiple times by a computing system.

FIG. 3 illustrates an environment 300 in which the method 200 may be performed multiple times by a computing system 310. Specifically, in the illustrated example, the computing system 310 receives a first hydrograph data set 311 for a first sample point, and generates a resulting candidate detection output 321 for that first sample point. Likewise, the computing system 310 receives a second hydrograph data set 312 for a second sample point, and generates a resulting candidate detection output 322 for that second sample point. Similarly, the computing system 310 receives a third hydrograph data set 313 for a third sample point, and generates a resulting candidate detection output 323 for that third sample point. As represented by the ellipses 314 and 324, this computerized interpretation of hydrograph data sets may continue for any number of sample points in the target basin. In some embodiments, the computing system 310 also uses weather data 330 for the area of the target basin in order to further detect whether the location is a candidate for water intake.

Some discussion regarding characteristic patterns of water inflow in the flow hydrograph data set is presented above. This might best be understood by a human reader with reference to visualizations of the hydrograph data set—in other words with respect to hydrographs themselves. That said, the computing system need not visualize the hydrograph data set in order to analyze the hydrograph data set.

Figure 4A:
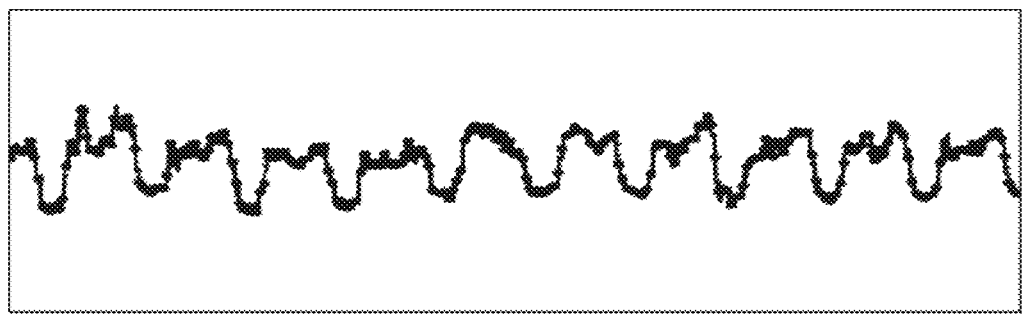
FIG. 4A illustrates a hydrograph that has a diurnal pattern but without having characteristic patterns of water intake.

FIGS. 4A through 4D each illustrate respective flow hydrographs with certain characteristic patterns. FIG. 4A illustrates a flow hydrograph 400A which represents a diurnal pattern of flow, and which is generally devoid of any indication of water intake. If the flow hydrograph data set corresponding to the flow hydrograph 400A was fed to the computing system 310, the computing system would almost certainly not identify the location as a candidate for water intake.

Figure 4B:
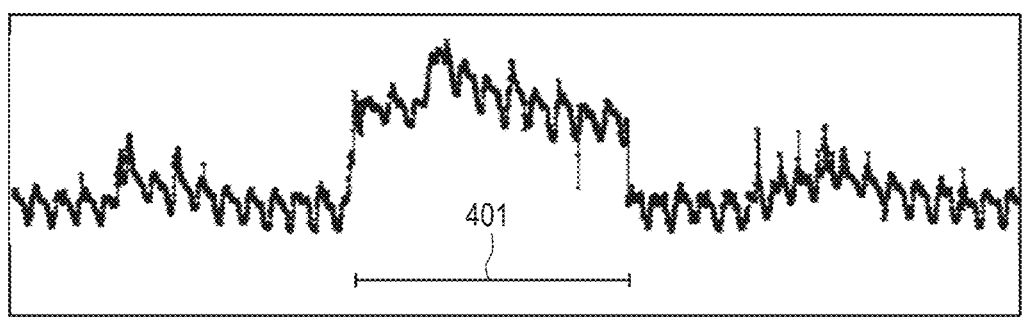
FIG. 4B illustrates a hydrograph having a characteristic pattern of a blockage.

FIG. 4B illustrates a flow hydrograph 400B which represents not only normal diurnal patterns, but also an elevated period 401. The elevated period represents a period that is characteristic of a blockage—which is not a problem with water intake per se, but which could nonetheless cause an environmental or public health hazard. Here, the sudden rise in flow is indicative of a major blockage occurring, whereas the sudden drop is representative of the blockage being suddenly released. By tracking each access point upstream to determine where the characteristic patterns of blockage first appear, an estimate of the location of the blockage may be determined. Remediation of the blockage could be affected by, for example, jet cleaning that portion of the wastewater system.

Figure 4C:
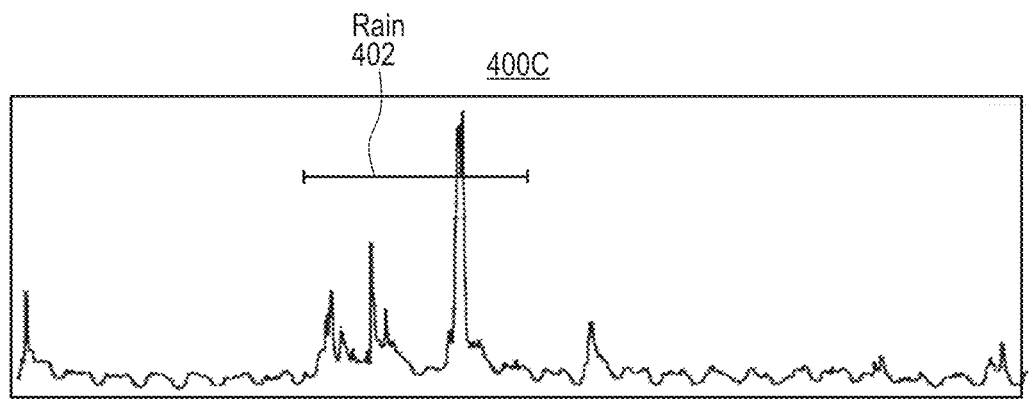
FIG. 4C illustrates a hydrograph having a characteristic pattern of water inflow responsive to a wet weather event.

FIG. 4C illustrates a flow hydrograph 400C which represents both normal diurnal behavior as well as sudden spikes that occur during a rainy period 402. While the rainy period 402 might not be annotated directly into the flow hydrograph 400C, the computing system may perhaps use the timing of the rainy period 402 to predict that the spikes during that time are indicative of sudden water inflow. By tracking each access point upstream to determine where the characteristic patterns of water inflow first appear, an estimate of the location of the water inflow may be made.

In the case of water inflow, the problem might be remediated by, for example, walking the suspected problem area to find any obvious appearance that the wastewater system is open to the surface (e.g., a manhole cover being missing). Alternatively, or in addition, with appropriate community coordination, smoke testing may be done to determine where water is inflowing into the wastewater system. Alternatively, or in addition, close circuit television (CCTV) may be used to monitor inflow occurrences.

Figure 4D:
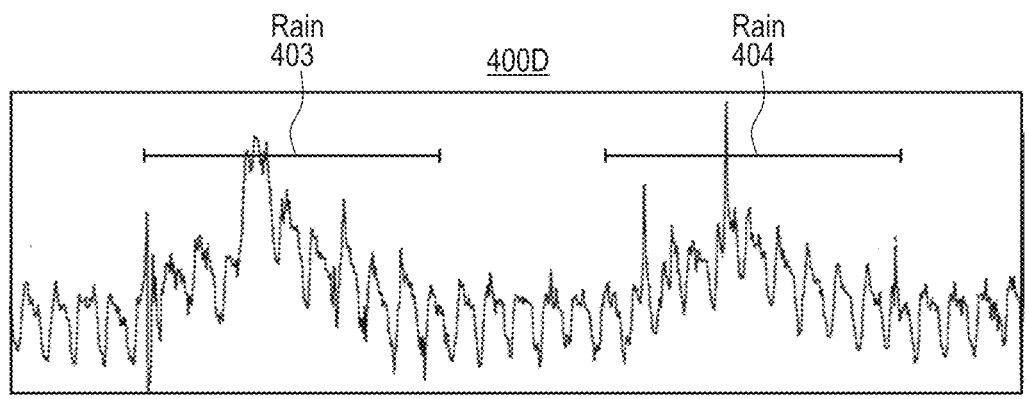
FIG. 4D illustrates a hydrograph having a characteristic pattern of water infiltration responsive to two wet weather events.

FIG. 4D illustrates a flow hydrograph 400D which represents both normal diurnal patterns as well as gradual increases and decreases that occur during the rainy period 403 and during the rainy period 404. Again, while the rainy periods 403 and 404 might not be annotated directly into the flow hydrograph 400D, the computing system 310 may perhaps use the timing of the rainy periods 403 and 404 to predict that the generalized flow increases during that time are indicative of gradual water infiltration occurring during rainy periods 403 and 404. The fact that the same pattern is observed for both rainy periods strengthens the confidence that there is water infiltration. By tracking each access point upstream to determine where the characteristic patterns of water infiltration first appear, an estimate of the location of the water infiltration may be made. In the case of water infiltration, the problem might be remediated by, for example, with appropriate community coordination, smoke testing to determine where water is infiltrating into the wastewater system. Alternatively, or in addition, close circuit television (CCTV) may be used to monitor infiltration occurrences.

While FIGS. 4A through 4D show characteristic patterns of water intake as might be present within a flow hydrograph, similar characteristic patterns may appear in level hydrographs and velocity hydrographs. In one embodiment, the computerized pattern recognition is performed by a neural network that receives as input a hydrographic data set (and potentially also the weather data) and outputs whether or not the flow hydrograph shows patterns indicative of water intake.

Although not required, the computerized pattern recognition for some or all of the hydrograph data sets of the target basin may be performed by a neural network. Thus, the computing system 310 may be a neural network. In that case, the neural network receives as input a hydrograph data set and outputs whether or not the hydrograph data set represents a pattern indicative of water intake. The neural network may further use weather data to make the prediction of whether the hydrograph data set represents a pattern indicative of water intake.

That neural network may be trained as an example using supervised learning in which various hydrograph data sets are fed into the neural network. In supervised learning, labels indicate whether or not the respective location of the hydrograph data set had water intake and potentially what kind of water intake. By comparing the neural network's prediction with the label, the training computing system knows whether or not the neural network provided an accurate or inaccurate prediction. Based on this accuracy result, the training system adjusts the weights of the various nodes in the neural network. This process may be repeated whereupon the neural network learns how to predict the presence of characteristic patterns of water intake more accurately.

Alternatively, the neural network may be trained using unsupervised learning. In that case, the neural network may represent each hydrograph data set as a plot point in multi-dimensional space having potentially even hundreds or thousands of dimensions. Based on clustering of points positioned within that multi-dimensional space, the neural network may identify whether the hydrograph data set represents a candidate for water intake, what type of water intake, and the confidence level of the prediction. For instance, confidence level may be derived based on position of a respective point in multi-dimensional space as compared to other points having the same predicted water intake, and water intake type.

Alternatively, or in addition, the computerized pattern recognition may be performed for some or all of the hydrograph data sets using statistical analysis of the hydrograph data set. As an example, the hydrograph data set may be fit (using least-squared fitting) to a sinusoidal wave that has a frequency of one cycle per day. Additional sinusoidal waves with other frequencies may also be used to fit to other cyclic patterns that may exist in the hydrograph data set. For instance, another frequency could be one cycle per week, to account for possible weekly variation that may occur in the hydrograph data set. As an example, there may be more wastewater during the weekend when there are more residents in the residential area. Another possible cyclical variation may be annually—with a frequency of one cycle per year. This might account for seasonal changes in the hydrograph data set. For instance, if snowmelt is causing water intake, then there might be higher flows in spring than in winter. Also, rainy season might cause varying water intake.

The cumulative sinusoidal waves may be subtracted from the hydrograph data set for further analysis. Here, there may be pulses that extend for the duration of a period of rain, and which have a magnitude greater than some number of standard deviations of the rest of the hydrograph data. From this, the presence of water intake, and potentially the type of water intake, and the confidence level of the predicted water intake may be determined heuristically.

Figure 5:
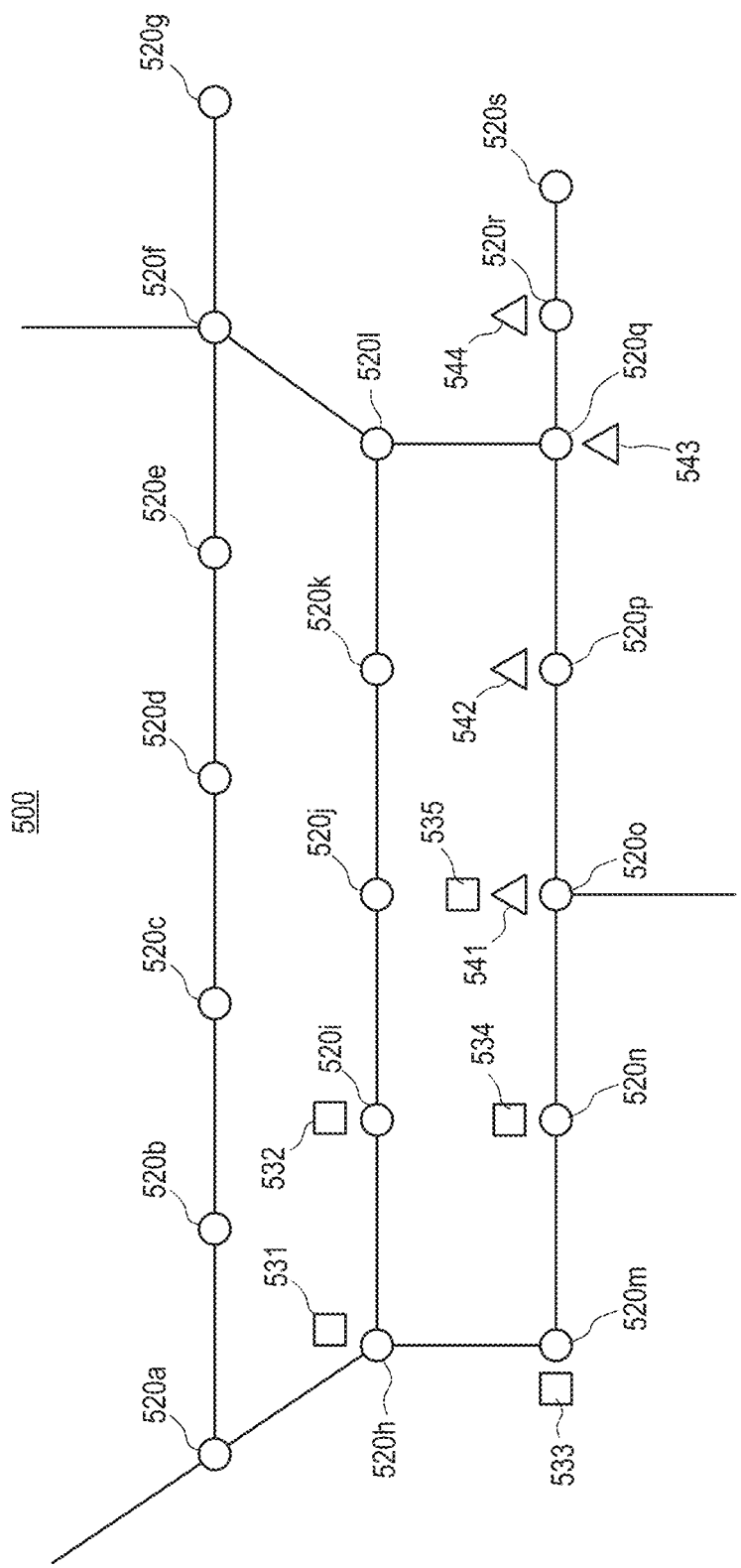
FIG. 5 illustrates an example of a user interface that focusses in on the target basin of FIG. 1, and that includes visual representations of candidate locations for water intake superimposed on a map of the target basin.

FIG. 5 illustrates an example of a user interface 500 that focusses in on the target basin 110 of FIG. 1. Here, there are visual representations 520a through 520s (collectively, "visual representations 520") of each of the access points 120a through 120s, respectively, of the target basin 110. Furthermore, the geographic distribution of the visual representations 520 approximates the actual geographic distribution of the access points 120. For instance, the global positioning system coordinates of each of the access points as well as the connections of each of the access points may be fed to the computing system that generates the user interface 500. Furthermore, the user interface 500 also includes a visualization type (e.g., a triangle) that represents one water intake type (e.g., water infiltration) and another visualization type (e.g., a square) that represents another water intake type (e.g., water inflow). This visualization may be generated using the candidate detection output generated by the computing system 310 in FIG. 3.

By evaluating the user interface 500, a user can infer that there is a problem with water inflow that is occurring in or around access point 120i represented by visualization 520i. This is because the visualization of water inflow (squares 531 through 535) are present at all of the visualizations 520h, 520i, 520m, 520n and 520o, and visualization 520i represent the most upstream portion of the wastewater system at which water inflow characteristics first appear in the respective flow hydrograph data set. Alternatively, the computing system that generates the user interface may make this inference on its own, and just mark the access point at which water inflow occurs most upstream (e.g., visualization 520*i* in this example).

Furthermore, by evaluating the user interface, a user can infer that there is a problem with water infiltration that is occurring in or around access point 120*r* represented by visualization 520*r*. This is because the visualization of water infiltration (triangles 541 through 544) are present at all of the visualizations 5200, 520*p*, 520*q* and 520*r*, and visualization 520*r* represent the most upstream portion of the wastewater system at which water infiltration characteristics first appear in the respective flow hydrograph. Alternatively, the computing system that generates the user interface may make this inference on its own, and just mark the access point at which water inflow occurs most upstream (e.g., visualization 520*r* in this example).

Figure 6:
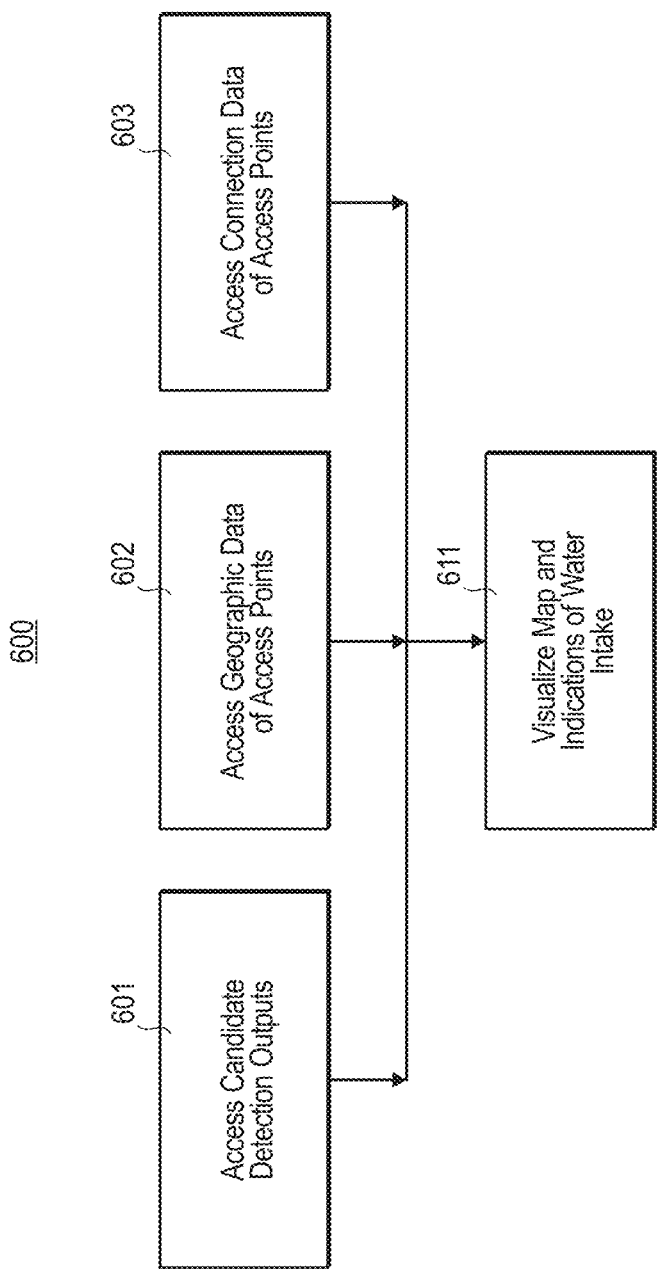
FIG. 6 illustrates a flowchart of a method for visualizing water intake.

FIG. 6 illustrates a flowchart of a method 600 for visualizing water intake. The method 600 may be performed by a computing system that may be the same as or different than the computing system 310 of FIG. 3. The method 600 includes accessing the candidate detection outputs for the target basin (act 601), the geographic data for each of the respective sample points (act 602), and the connection data for which access point is connected to which access point (act 603). From this information, the computing system visualizes each of at least some of the plurality of sample points on a geographical map along with an indication of whether or not the respective location is a candidate location (act 611). As shown in FIG. 5, this visualization could include an indication of a type of water intake for a candidate location. However, the visualization could also include an indication of a confidence level that the candidate location is indicative of water intake, and/or an estimated severity level of the water intake. The detected amplitude of the characteristic pattern (as compared to the normal diurnal pattern) could be used to generate that confidence level and/or severity level.

Accordingly, the principles described herein allow for the automated detection of candidate locations of water intake in a target basin based on data from sensors positioned in a target basin. Because the determination and visualization of the candidate locations is automated based on the hydrograph data sets, undesired water inflow and water infiltration may be quickly identified. Thus, inflow and infiltration of wastewater systems may be more quickly detected and addressed. This reduces the risk of environmental harm due to the wastewater system being overloaded, allows wastewater systems to be smaller for a given amount of wastewater, and reduces the workload of the treatment system.

In the above description, the use of hydrograph data sets has been described with respect to a number of water parameters including water level, water velocity and water flow. However, a flow hydrograph data set will include more data from which severity of the flow intake may be derived. Accordingly, there is merit to working with flow hydrograph data sets. Nonetheless, flow sensors may be difficult to install in an access point of a target basin. Level sensors and/or velocity sensors may be much easier to install. Accordingly, embodiments will now be described in which the sensor installed in the access point is a level sensor (and potentially also a velocity sensor), but in which a flow hydrograph data set is obtained from the sensor data. This allows for more easier installation of the level and/or velocity sensor, while still providing reliable presence and severity detection of water intake based on evaluation of flow hydrograph data sets.

Figure 7:
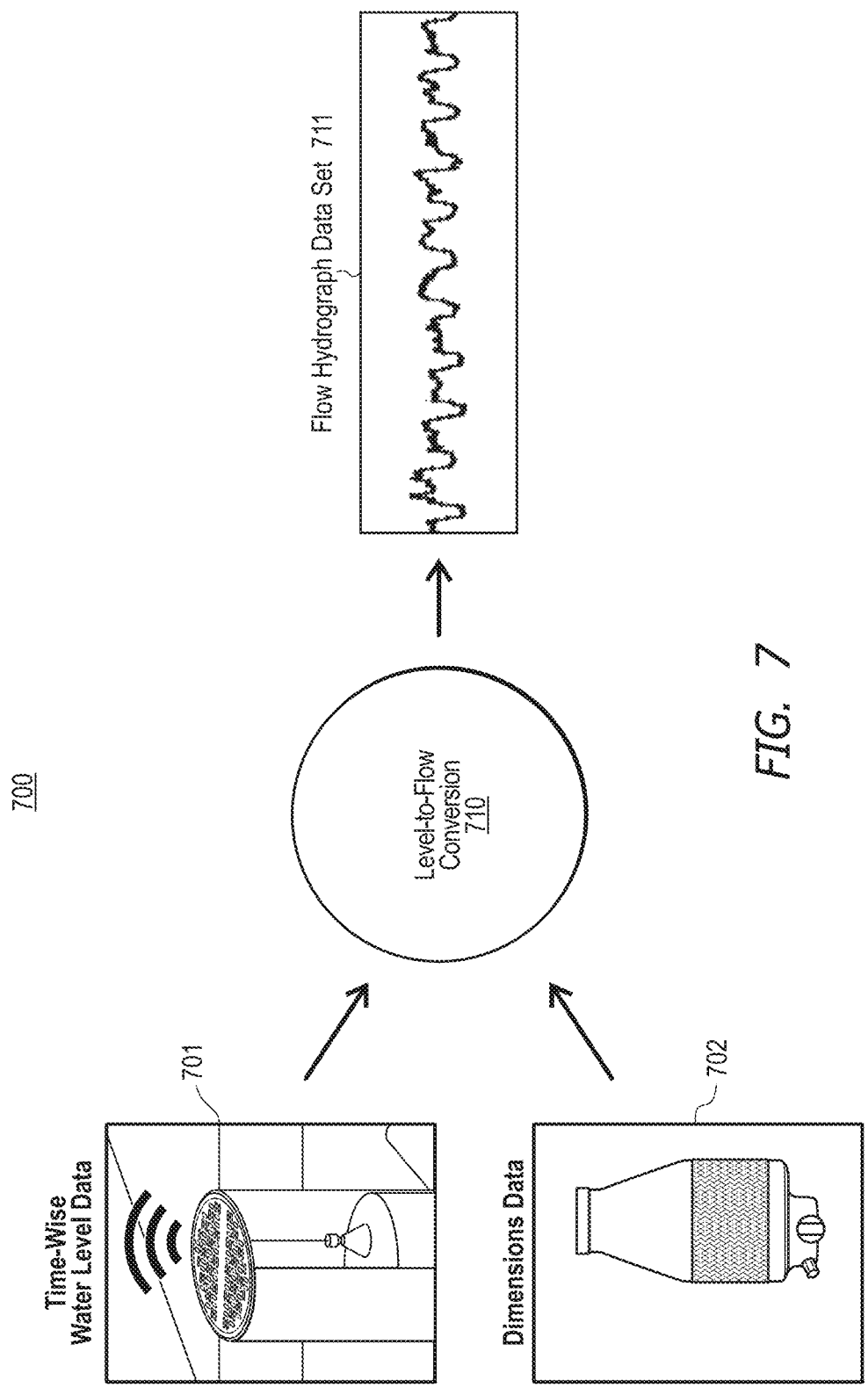
FIG. 7 illustrates an example data flow showing the conversion of time-wise level data into a flow hydrograph data set.

FIG. 7 illustrates an example data flow 700 showing the conversion of a time-wise level data set (i.e., a level hydrograph data set) into a flow hydrograph data set. In the example data flow 700, the time-wise level data 701 may be data generated in real-time by a level sensor positioned at an access point of the wastewater system. For instance, the level sensor may be positioned within an access point (such as a manhole) of the wastewater system. Level sensors are easy to install and remove. In the illustrated case, the level sensor is installed at the top of the manhole, whereupon the level of the wastewater is detected by emitting a radar, acoustic or ultrasonic signal, or another signal towards the wastewater and detecting the reflected signal. The level sensor may be equipped with wireless communication to allow for the real-time reporting to a centralized system that records (over time) levels of all access points that are equipped with a level sensor.

The time-wise water level data 701 is input to a level-to-flow conversion computing system 710 resulting in the generation of a flow hydrograph data set 711 that represents corresponding time-wise flow data. In the illustrated case, the flow hydrograph data set 711 includes a diurnal pattern representing characteristic daily variations of wastewater flow as would be typical where there is no water intake from the surrounding environment.

However, the mapping of time-wise water level data to time-wise flow data will depend on various attributes of the conduit through which wastewater travels. As a simple example, for a given flow amount, we can expect the water level to be higher in a narrower conduit than we can in a wider conduit. Thus, dimensions data 702 regarding that conduit is also an important input to the level-to-flow conversion process. The general principles of conversion of time-wise level data to flow-wise level data based on dimensions data have been known for some time. For instance, the Manning's equation and its variants can be used to estimate an amount of fluid flow based on a fluid level.

However, what is much more difficult is knowing with precision what the characteristic dimension data of a particular conduit actually is. As an example, the cross-sectional shapes of conduit might change from one access point to another (one might be flat on the bottom, another cylindrical, and so forth) which does affect how water level amounts would map to water flow amounts. Furthermore, the slope of the conduit may differ from one location to another, with steeper slopes having lower water levels for a given flow than less steep slopes. For instance, a conduit accessible from a manhole in a mountainous area may have a steeper slope than a conduit accessible from a manhole in a flatter area. Furthermore, each conduit may have different levels of degradation, which may also contribute to the resistance to flow allowed by that conduit-again affecting how level amounts may be mapped to flow amounts.

In one example, rather than having a person go into the manhole to take measurements of the conduit at each access point, a scanner tool may be inserted into the access point (e.g., the manhole) which allows for the rapid generation of a point cloud representing the walls of the conduit. This point cloud data may be fed into a computing system (e.g., the computing system 710) to generate a three-dimensional model of the conduit, from which the computing system may automatically generate dimensions data 702 of the conduit. This dimensions data 702 may include the cross-sectional shape, slope, and/or surface characteristics of the conduit.

FIG. 8 illustrates a method 800 for converting time-wise level data into a flow hydrograph in the case of the dimensions data for the respective access point being acquired from point cloud data of the attributes (e.g., the wall position, roughness and slope) of the underlying conduit. The method 800 includes accessing point cloud data for the attributes of the conduit through which wastewater flows at the particular location (act 801), converting the point cloud data into dimensions data for the conduit (act 802), and then converting the level sensor output data for the particular location to the flow hydrograph data set for the particular location using the dimensions data for the conduit through which wastewater flows at the particular location (act 803).

In this embodiment, to set up a target basin, there would be one trip to each access point (e.g., each manhole), and while at that access point, the scanning tool may be used to gather the point cloud data for the conduit accessible from that access point, and also at the same visit the level sensor may be installed. FIG. 9 illustrates a method 900 for provisioning an access point for evaluation for water intake, which may be performed by a human being since the provisioning can be performed quickly. The method 900 may be repeated for each of multiple or all access points in the target basin, moving from one access point to the next. The method 900 includes installing a level sensor at the location (i.e., the access point) in the target basin (act 901); and generating the point cloud data at each of the plurality of locations in the target basin using a scanning tool (act 902). In embodiments in which the point cloud is not used to generate the dimensions data 702, there is no need to perform act 902. Furthermore, there is no time dependency between the performance of acts 901 and 902 for each access point, and thus acts 901 and 902 are not shown as connected. If the target basin were relatively small (e.g., 20 linear miles or less), this could be done quite quickly.

Accordingly, referring to FIG. 7, the target basin may be relatively quickly provisioned to provide the time-wise level data 701 and the dimensions data 702, from which the level-to-flow conversion computing system 210 generates the corresponding flow hydrograph data set 711. In fact, a flow hydrograph data set may be generated for each access point at which a level sensor was installed. Velocity sensor output data may also be used in combination with the level sensor output data and the dimensions data to generate the flow hydrograph data set.

Figure 10:
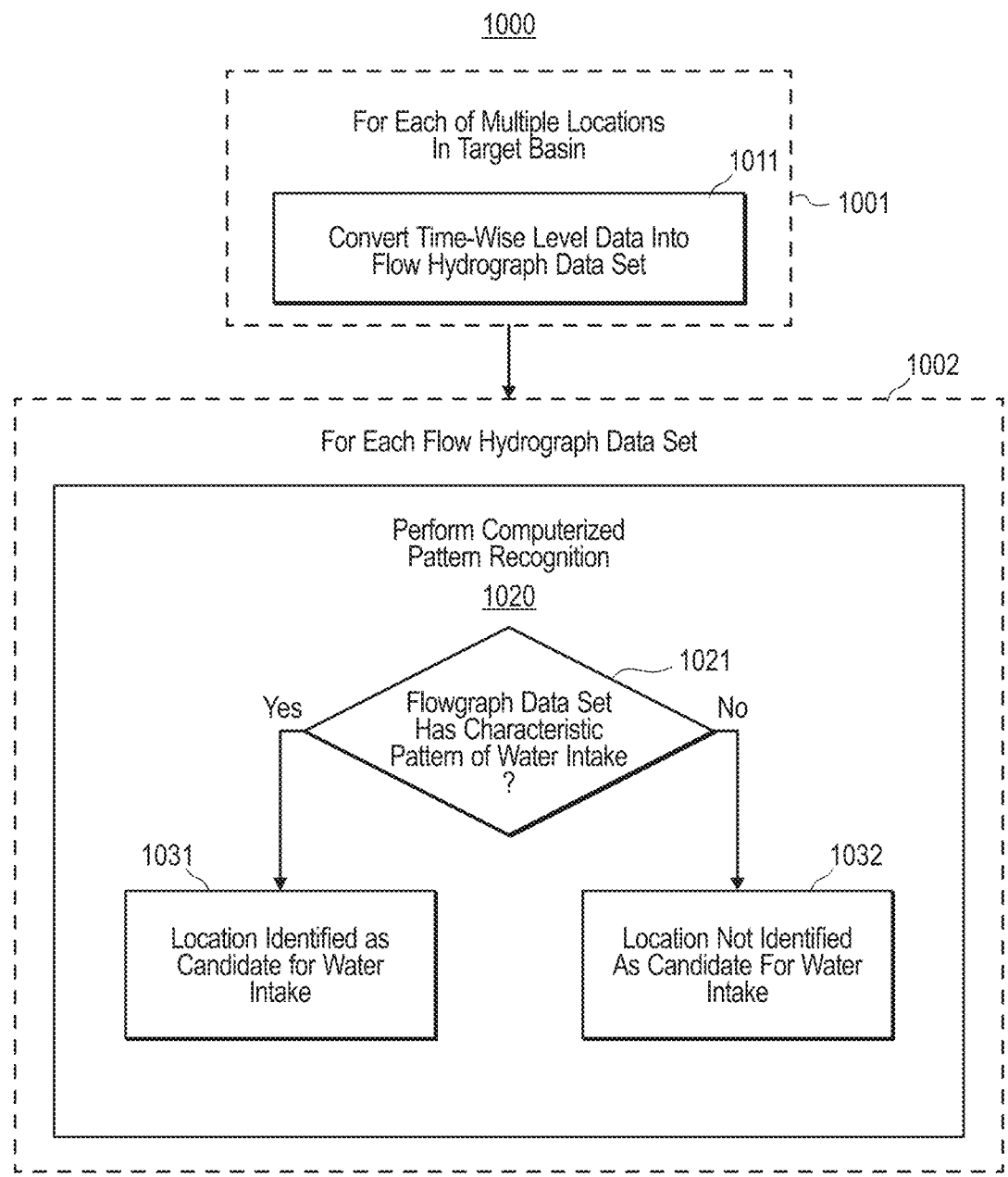
FIG. 10 is a flowchart of an example method for detecting candidate locations of water intake in the target basin of a wastewater system.
Figure 11:
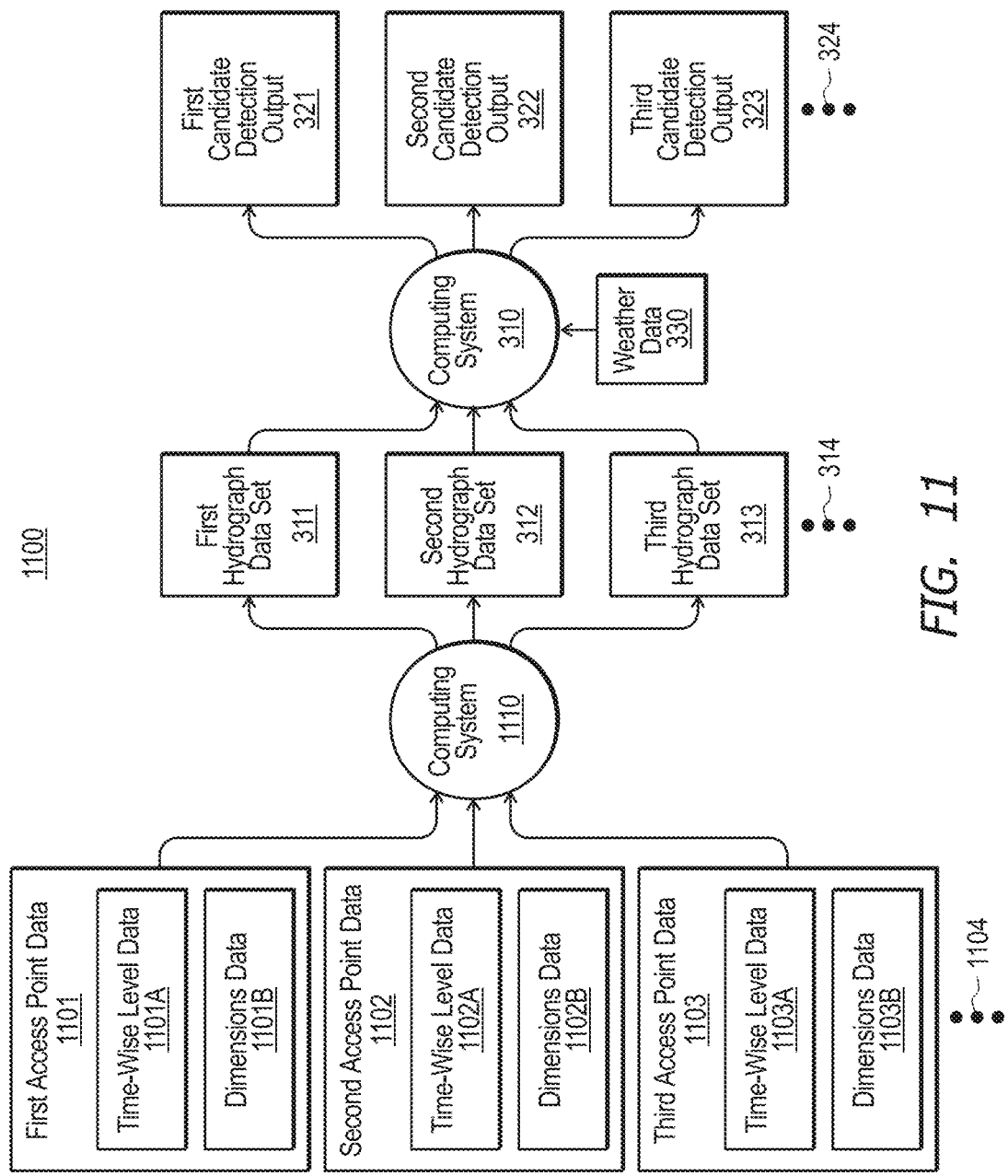
FIG. 11 illustrates a computerized environment in which the method of FIG. 10 may be performed, and illustrates various flows of example data.

The principles of automatic detection of candidate water intake locations in a target basin using level sensor output data will now be described. FIG. 10 is a flowchart of an example method 1000 for detecting candidate locations of water intake in the target basin of a wastewater system. FIG. 11 illustrates a computerized environment 1100 in which the method 1000 of FIG. 10 may be performed, and illustrates various flows of example data. Accordingly, the method 1000 of FIG. 10 will now be described with frequent reference to the computerized environment 1100 of FIG. 11. The environment 1100 expands on the environment 300 of FIG. 3, and thus the elements of the environment 300 of FIG. 3 are repeated in FIG. 11.

The method 1000 includes an act that occurs for each of multiple locations in the target basin. For instance, as represented by box 1001, for each of multiple locations in the target basin of the wastewater system, the method 1000 includes converting time-wise level sensor output data for the respective location into a flow hydrograph data set for the respective location (act 1011). The description above for FIG. 7 sets forth an example of how this might be performed for one location, but that may be repeated for multiple locations to generate multiple flow hydrograph data sets for the target basin of the wastewater system. As an example, for the target basin 110 of FIG. 1, a flow hydrograph data set may be generated for each of some or all of the access points 120.

Referring to FIG. 11, the computerized conversion of time-wise level sensor output data into corresponding flow hydrograph data sets is illustrated by the computing system 1110 receiving first access point data 1101 in the form of time-wise level data 1101A and dimensions data 1101B for that first access point, and generating a resulting flow hydrograph data set 311 for that first access point. Likewise, the computing system 1110 receives second access point data 1102 in the form of time-wise level data 1102A and dimensions data 1102B for that second access point, and generates a resulting flow hydrograph data set 312 for that second access point. Similarly, the computing system 1110 receives third access point data 1103 in the form of time-wise level data 1103A and dimensions data 1103B for that third access point, and generates a resulting flow hydrograph data set 313 for that third access point. As represented by the ellipses 1104 and 314, this generation of flow hydrograph data sets may continue for any number of access points in the target basin.

Returning back to FIG. 10, computerized pattern recognition may then be performed by, for any given flow hydrograph data set, performing computerized pattern recognition of the flow hydrograph data set (act 1020). This act is illustrated within box 1002 representing that this computerized pattern recognition may be performed for any number of the generated flow hydrograph data sets. Specifically, for any given flow hydrograph data set, the computerized pattern recognition detects whether or not the respective flow hydrograph data set has characteristic patterns of water intake (decision block 1021). If the characteristic pattern of water intake is detected ("Yes" in decision block 1021), then the respective location is identified as a candidate location for water intake (act 531). Otherwise, if the characteristic pattern is not detected ("No" in decision block 1021), then the respective location is not identified as a candidate location for water intake (act 1022).

Referring to FIG. 11, computerized interpretation of those flow hydrograph data sets to identify candidate locations for water intake is illustrated by the computing system 310 receiving various hydrograph data set input, much as described above with respect to FIG. 3. Of course, the computing system 1010 and the computing system 310 may be the same computing system or a different computing system.

Accordingly, the principles described herein allow for the automated detection of candidate locations of water intake in a target basin based on data from level sensors-rather than flow sensors. Thus, inflow and infiltration of wastewater systems may be more quickly detected and addressed. This reduces the risk of environmental harm due to the wastewater system being overloaded, allows wastewater systems to be smaller for a given amount of wastewater, and reduces the workload of the treatment system.

Because the principles described herein may be performed in the context of a computing system, some introductory discussion of a computing system will be described with respect to FIG. 12. For instance, computing systems 310, 710 and 1110 are described herein as a computing system. Furthermore, the system that trains the neural network may be a computing system. Also, the system that runs the neural network to generate predictions may be a computing system.

Computing systems are now increasingly taking a wide variety of forms. Computing systems may, for example, be handheld devices, appliances, laptop computers, desktop computers, mainframes, distributed computing systems, data centers, virtual machines, neural networks, or even devices that have not conventionally been considered a computing system, such as wearables (e.g., glasses). In this description and in the claims, the term "computing system" is defined broadly as including any device or system (or a combination thereof) that includes at least one physical and tangible processor, and a physical and tangible memory capable of having thereon computer-executable instructions that may be executed by a processor. The memory may take any form and may depend on the nature and form of the computing system. A computing system may be distributed over a network environment and may include multiple constituent computing systems.

Figure 12:
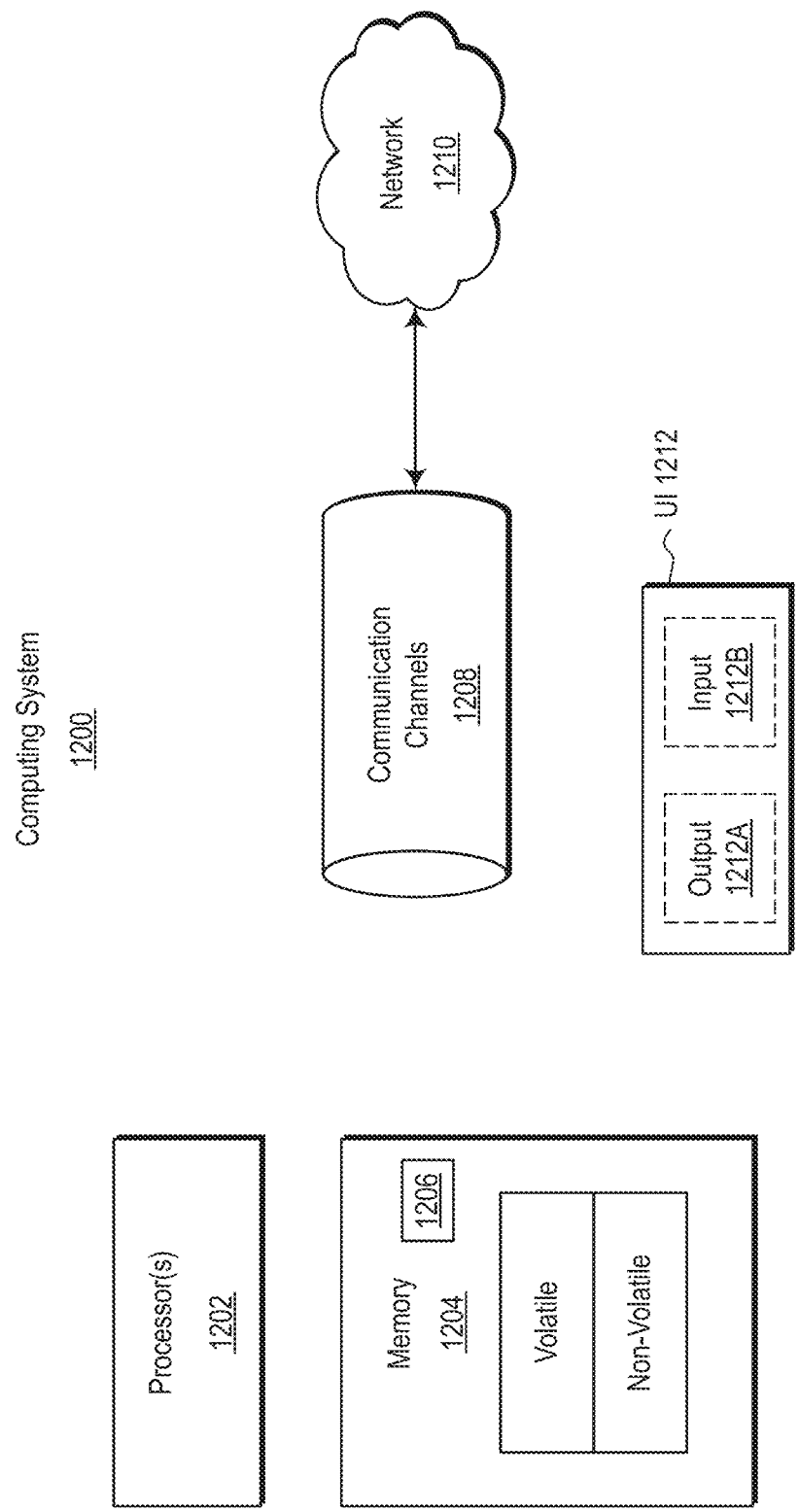
FIG. 12 illustrates an example computing system in which the principles described herein may be employed.

As illustrated in FIG. 12, in its most basic configuration, a computing system 1200 includes at least one hardware processing unit 1202 and memory 1204. The processing unit 1202 includes a general-purpose processor. Although not required, the processing unit 1202 may also include a field programmable gate array (FPGA), an application specific integrated circuit (ASIC), or any other specialized circuit—such as a neural network. In one embodiment, the memory 1204 includes a physical system memory. That physical system memory may be volatile, non-volatile, or some combination of the two. In a second embodiment, the memory is non-volatile mass storage such as physical storage media. If the computing system is distributed, the processing, memory and/or storage capability may be distributed as well.

The computing system 1200 also has thereon multiple structures often referred to as an "executable component". For instance, the memory 1204 of the computing system 1200 is illustrated as including executable component 1206. The term "executable component" is the name for a structure that is well understood to one of ordinary skill in the art in the field of computing as being a structure that can be software, hardware, or a combination thereof. For instance, when implemented in software, one of ordinary skill in the art would understand that the structure of an executable component may include software objects, routines, methods (and so forth) that may be executed on the computing system. Such an executable component exists in the heap of a computing system, in computer-readable storage media, or a combination.

One of ordinary skill in the art will recognize that the structure of the executable component exists on a computer-readable medium such that, when interpreted by one or more processors of a computing system (e.g., by a processor thread), the computing system is caused to perform a function. Such structure may be computer readable directly by the processors (as is the case if the executable component were binary). Alternatively, the structure may be structured to be interpretable and/or compiled (whether in a single stage or in multiple stages) so as to generate such binary that is directly interpretable by the processors. Such an understanding of example structures of an executable component is well within the understanding of one of ordinary skill in the art of computing when using the term "executable component".

The term "executable component" is also well understood by one of ordinary skill as including structures, such as hard coded or hard wired logic gates, that are implemented exclusively or near-exclusively in hardware, such as within a field programmable gate array (FPGA), an application specific integrated circuit (ASIC), or any other specialized circuit. Accordingly, the term "executable component" is a term for a structure that is well understood by those of ordinary skill in the art of computing, whether implemented in software, hardware, or a combination. In this description, the terms "component", "agent", "manager", "service", "engine", "module", "virtual machine" or the like may also be used. As used in this description, these terms (whether expressed with or without a modifying clause) are also intended to be synonymous with the term "executable component", and thus also have a structure that is well understood by those of ordinary skill in the art of computing.

In the description that follows, embodiments are described with reference to acts that are performed by one or more computing systems. If such acts are implemented in software, one or more processors (of the associated computing system that performs the act) direct the operation of the computing system in response to having executed computer-executable instructions that constitute an executable component. For example, such computer-executable instructions may be embodied on one or more computer-readable media that form a computer program product. An example of such an operation involves the manipulation of data. If such acts are implemented exclusively or near-exclusively in hardware, such as within a FPGA or an ASIC, the computer-executable instructions may be hard-coded or hard-wired logic gates. The computer-executable instructions (and the manipulated data) may be stored in the memory 1204 of the computing system 1200. Computing system 1200 may also contain communication channels 908 that allow the computing system 1200 to communicate with other computing systems over, for example, network 1210.

While not all computing systems require a user interface, in some embodiments, the computing system 1200 includes a user interface system 1212 for use in interfacing with a user. The user interface system 1212 may include output mechanisms 1212A as well as input mechanisms 1212B. The principles described herein are not limited to the precise output mechanisms 1212A or input mechanisms 1212B as such will depend on the nature of the device. However, output mechanisms 1212A might include, for instance, speakers, displays, tactile output, virtual or augmented reality, holograms and so forth. Examples of input mechanisms 1212B might include, for instance, microphones, touch-screens, virtual or augmented reality, holograms, cameras, keyboards, mouse or other pointer input, sensors of any type, and so forth.

Embodiments described herein may comprise or utilize a special-purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general-purpose or special-purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM, or other optical disk storage, magnetic disk storage, or other magnetic storage devices, or any other physical and tangible storage medium which can be used to store desired program code means in the form of computer-executable instructions or data structures and which can be accessed by a general-purpose or special-purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmission media can include a network and/or data links which can be used to carry desired program code means in the form of computer-executable instructions or data structures and which can be accessed by a general-purpose or special-purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then be eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general-purpose computing system, special-purpose computing system, or special-purpose processing device to perform a certain function or group of functions. Alternatively, or in addition, the computer-executable instructions may configure the computing system to perform a certain function or group of functions. The computer executable instructions may be, for example, binaries or even instructions that undergo some translation (such as compilation) before direct execution by the processors, such as intermediate format instructions such as assembly language, or even source code.

Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing system, which are linked (either by hardwired data links, wireless data links, or by a combination of hardwired and wireless data links) through a network, both perform tasks. In a distributed system environment, program modules may be located in both local and remote memory storage devices.

Those skilled in the art will also appreciate that the invention may be practiced in a cloud computing environment. Cloud computing environments may be distributed, although this is not required. When distributed, cloud computing environments may be distributed internationally within an organization and/or have components possessed across multiple organizations. In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For the processes and methods disclosed herein, the operations performed in the processes and methods may be implemented in differing order. Furthermore, the outlined operations are only provided as examples, and some of the operations may be optional, combined into fewer steps and operations, supplemented with further operations, or expanded into additional operations without detracting from the essence of the disclosed embodiments.

Literal Claim Support Section

Clause 1. A method for a computing system identifying one or more candidate locations of water intake in a target basin of a wastewater system, the method comprising: accessing, by the computing system, a plurality of hydrograph data sets, each hydrograph data set generated from sampling at a respective sample point of a target basin of a wastewater system such that the plurality of hydrograph data sets corresponds to a plurality of sample points in the target basin, the sample points being ten or more and having a density within the target basin of at least two per linear mile of the target basin; and performing, by the computing system, computerized pattern recognition of the plurality of hydrograph data sets to identify, based on detection of characteristic patterns of water intake present in the respective hydrograph data sets, identifying one or more candidate locations of the target basin that are candidates for water intake.

Clause 2. The method in accordance with Clause 1, the plurality of hydrograph data sets including at least one level hydrograph data set.

Clause 3. The method in accordance with Clause 1, the plurality of hydrograph data sets including at least one velocity hydrograph data set.

Clause 4. The method in accordance with Clause 1, the plurality of hydrograph data sets including at least one flow hydrograph data set.

Clause 5. The method in accordance with Clause 1, the accessing of the plurality of hydrograph data sets comprising generating the plurality of hydrograph data sets.

Clause 6. The method in accordance with Clause 5, multiple of the hydrograph data sets being flow hydrograph data sets, the generating of the plurality of hydrograph data sets comprising the following for each of the multiple flow hydrograph data sets: accessing a respective level hydrograph data set; and converting the respective level hydrograph data set into a respective flow hydrograph data set that corresponds to a sample point from which the level hydrograph data set was sampled.

Clause 7. The method in accordance with Clause 6, the converting of the level hydrograph data set into the flow hydrograph data set comprising the following for each of at least some of the multiple hydrograph data sets: accessing point cloud data for the attributes of the conduit at a respective sample point; converting the point cloud data into dimensional and slope data for the conduit at the respective sample point; and converting the level hydrograph data set for the particular location to the flow hydrograph data set for the particular location using the dimensional and slope data.

Clause 8. The method in accordance with Clause 7, further comprising: installing a level sensor at each of the sample points plurality of locations in the target basin; and generating the point cloud data at each of the plurality of locations in the target basin.

Clause 9. The method in accordance with Clause 1, the method further comprising: visualizing each of at least some of the plurality of locations on a geographical map along with an indication of whether or not the respective location is a candidate location resulting from the identification of one or more candidate locations of the target basin as are candidates for water intake.

Clause 10. The method in accordance with Clause 9, the visualization further including an indication of a confidence level that the candidate location is indicative of water intake.

Clause 11. The method in accordance with Clause 10, the visualization further including an indication of a type of water intake for which the candidate location is a candidate.

Clause 12. The method in accordance with Clause 1, the target basin of the wastewater system being of less than 20 linear miles of underground pipes.

Clause 13. The method in accordance with Clause 1, the computerized pattern recognition for at least one hydrograph data set being performed by a neural network that receives as input a hydrograph data set and outputs whether or not the hydrograph data set represents a pattern indicative of water intake.

Clause 14. The method in accordance with Clause 1, the computerized pattern recognition also performed using weather data.

Clause 15. The method in accordance with Clause 1, the computerized pattern recognition for at least one hydrograph data set being performed by computerized statistical analysis of the hydrograph data set.

Clause 16. The method in accordance with Clause 1, the target basin of the wastewater system being of less than 20 linear miles of underground pipes.

Clause 17. The method in accordance with Clause 1, the sample points having a density within the target basin of at least five per linear mile of the target basin.

Clause 18. The method in accordance with Clause 1, the sample points having a density within the target basin of at least ten per linear mile of the target basin.

Clause 19. The method in accordance with Clause 1, the sample points being at least twenty-five sample points.

Clause 20. A computing system comprising: one or more processors; and one or more computer readable storage media on which are stored one or more computer-executable instructions that are structured so that when processed by the processor, the computing system is caused to perform the following: accessing a plurality of hydrograph data sets, each hydrograph data set generated from sampling at a respective sample point of a target basin of a wastewater system such that the plurality of hydrograph data sets corresponds to a plurality of sample points in the target basin, the sample points being ten or more and having a density within the target basin of at least two per linear mile of the target basin; and performing computerized pattern recognition of the plurality of hydrograph data sets to identify, based on detection of characteristic patterns of water intake present in the respective hydrograph data sets, identifying one or more candidate locations of the target basin that are candidates for water intake.

The present invention may be embodied in other specific forms without departing from its spirit or characteristics. The described embodiments are to be considered in all respects only as illustrative and not restrictive. The scope of the invention is, therefore, indicate by the appended claims rather than by the foregoing description. All changes which come within the meaning and range of equivalency of the claims are to be embraced within their scope.

What is claimed is:

1. A method for diagnosing problems in a wastewater systems by identifying candidate locations for water intake in a target basin of the wastewater system to enable rapid remediation of the water intake, the method comprising:
   accessing, by a computing system, level data signals from each of a plurality of level sensors installed in the target basin of the wastewater system, the level sensors numbering ten or more and having a density within the target basin of at least two per linear mile within the target basin;
   converting, by the computing system, the level data signals from each level sensor into a level hydrograph data set for that level sensor, thereby generating a plurality of level hydrographic data sets,
   generating, by the computing system, a corresponding plurality of flow hydrographic data sets by converting each level hydrographic data set into a flow hydrographic data set, based on dimensional data for the conduit in which the respective level sensor is installed;
   performing, by the computing system, computerized pattern recognition on the plurality of hydrograph data sets to detect patterns indicative of water intake; and
   identifying, based on the detected patterns, one or more candidate locations of the target basin as candidates for water intake for purposes of initiating a remediation response to remediate the water intake.

2. The method in accordance with claim 1, the converting of the level hydrograph data set into the flow hydrograph data set comprising the following for each of at least some of the multiple flow hydrograph data sets:
   accessing point cloud data for attributes of a conduit at a respective location at which a respective level sensor is installed; and
   converting the point cloud data into dimensions data for the conduit.

3. The method in accordance with claim 2, further comprising:
   installing the plurality of level sensors in the target basin at the plurality of locations; and
   generating the point cloud data at each of the plurality of locations in the target basin.

4. The method in accordance with claim 1, the method further comprising:
   visualizing each of at least some of the plurality of locations on a geographical map along with an indication of whether or not the respective location is a candidate location resulting from the identification of one or more candidate locations of the target basin as are candidates for water intake.

5. The method in accordance with claim 4, the visualization further including an indication of a confidence level that the candidate location is indicative of water intake.

6. The method in accordance with claim 5, the visualization further including an indication of a type of water intake for which the candidate location is a candidate.

7. The method in accordance with claim 1, the target basin of the wastewater system being of less than 20 linear miles of underground pipes.

8. The method in accordance with claim 1, the computerized pattern recognition on at least one flow hydrograph data set being performed by a neural network that receives as input a flow hydrograph data set and outputs whether or not the flow hydrograph data set represents a pattern indicative of water intake.

9. The method in accordance with claim 1, the computerized pattern recognition also performed using weather data.

10. The method in accordance with claim 1, the computerized pattern recognition for at least one flow hydrograph data set being performed by computerized statistical analysis of the flow hydrograph data set.

11. The method in accordance with claim 1, the target basin of the wastewater system being of less than 20 linear miles of underground pipes.

12. The method in accordance with claim 1, the plurality of level sensors having a density within the target basin of at least five per linear mile of the target basin.

13. The method in accordance with claim 1, the plurality of level sensors having a density within the target basin of at least ten per linear mile of the target basin.

14. The method in accordance with claim 1, the plurality of level sensors being at least twenty-five sample points.

15. A computing system comprising:
one or more processors; and
one or more computer readable storage media on which are stored one or more computer-executable instructions that are structured so that when processed by the processor, the computing system is caused to perform the following:
accessing level data signals from each of a plurality of level sensors installed in the target basin of the wastewater system, the level sensors numbering ten or more and having a density within the target basin of at least two per linear mile within the target basin;
converting the level data signals from each level sensor into a level hydrograph data set for that level sensor, thereby generating a plurality of level hydrographic data sets;
generating, by the computing system, a corresponding plurality of flow hydrographic data sets by converting each level hydrographic data set into a flow hydrographic data set, based on dimensional data for the conduit in which the respective level sensor is installed; and
performing computerized pattern recognition on the plurality of hydrograph data sets to detect patterns indicative of identify, based on detection of characteristic patterns of water intake for purposes of initiating a remediation response to remediate the water intake.

* * * * *